US010592330B2

(12) United States Patent
Gowin et al.

(10) Patent No.: US 10,592,330 B2
(45) Date of Patent: *Mar. 17, 2020

(54) SYSTEMS AND METHODS FOR AUTOMATIC REPLACEMENT AND REPAIR OF COMMUNICATIONS NETWORK DEVICES

(71) Applicant: LEVEL 3 COMMUNICATIONS, LLC, Broomfield, CO (US)

(72) Inventors: Lawrence Wayne Gowin, Westminster, CO (US); Matthew David Flynn, Fort Collins, CO (US); Mark Michael Warren, Stoneham, MA (US); Ricky Lynn Nooner, Broomfield, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 12 days.

This patent is subject to a terminal disclaimer.

(21) Appl. No.: 15/811,480

(22) Filed: Nov. 13, 2017

(65) Prior Publication Data
US 2018/0067795 A1 Mar. 8, 2018

Related U.S. Application Data

(63) Continuation of application No. 13/673,550, filed on Nov. 9, 2012, now Pat. No. 9,817,709.

(Continued)

(51) Int. Cl.
G06F 11/07 (2006.01)
H04L 12/26 (2006.01)
H04L 12/24 (2006.01)

(52) U.S. Cl.
CPC ...... G06F 11/0793 (2013.01); G06F 11/0709 (2013.01); G06F 11/0748 (2013.01); H04L 41/0672 (2013.01); H04L 43/0817 (2013.01)

(58) Field of Classification Search
CPC ............ G06F 11/0793; G06F 11/0709; G06F 11/0748; G06F 11/079; H04L 41/0672; H04L 43/0817; H04L 43/0823

(Continued)

(56) References Cited

U.S. PATENT DOCUMENTS 5,678,002 A 10/1997 Fawcett et al.
5,926,619 A 7/1999 Badovinatz et al.

(Continued)

FOREIGN PATENT DOCUMENTS

EP 1397744 A2 3/2004
GB 2435362 A 8/2007
WO WO-199503580 A1 2/1995

OTHER PUBLICATIONS

"Configuration File", *Wikipedia* Retrieved from the Internet: https://en.wikipedia.org/w/index.pho?title=Configuration_file&oldid=501178689 [retrieved Jun. 22, 2018]; XP055486909 Jul. 8, 2012, 4 pgs.

(Continued)

*Primary Examiner* — Joseph R Kudirka

(57) ABSTRACT

Systems and methods for automatic repair, replacement, and/or configuration of various network devices within a communications network are disclosed. The system may receive indication of a failed network device and automatically perform diagnostic on the network device to determine any problems associated with the hardware and/or software components within the network device. Subsequently one or more repair, replacement, and/or configuration procedures may be automatically initiated in an attempt to resolve the problems and restore the failed network device.

9 Claims, 4 Drawing Sheets

Related U.S. Application Data

(60) Provisional application No. 61/558,857, filed on Nov. 11, 2011.

(58) Field of Classification Search
USPC .................. 714/4.1, 4.3, 4.4, 6.13, 15, 43
See application file for complete search history.

(56) References Cited

U.S. PATENT DOCUMENTS

| | | |
|---|---|---|
| 7,287,192 B1 | 10/2007 | Engel |
| 7,302,608 B1 | 11/2007 | Acharya et al. |
| 7,321,992 B1 | 1/2008 | Vellore et al. |
| 7,509,415 B2 | 3/2009 | Baekelmans et al. |
| 7,571,349 B2 | 8/2009 | Levidow et al. |
| 7,680,957 B1 | 3/2010 | Ketterhagen et al. |
| 8,347,263 B1 | 1/2013 | Offer |
| 8,548,956 B2 | 10/2013 | Allison et al. |
| 2001/0010085 A1* | 7/2001 | Rafanello ........... G11B 20/1883 714/710 |
| 2002/0078017 A1 | 6/2002 | Cerami et al. |
| 2003/0051195 A1 | 3/2003 | Bosa et al. |
| 2004/0078647 A1* | 4/2004 | Das Sharma ....... G06F 11/2005 714/6.32 |
| 2004/0078683 A1 | 4/2004 | Buia et al. |
| 2005/0038818 A1 | 2/2005 | Hooks |
| 2005/0125461 A1 | 6/2005 | Filz |
| 2005/0138557 A1 | 6/2005 | Bolder et al. |
| 2005/0257213 A1 | 11/2005 | Chu et al. |
| 2006/0190579 A1 | 8/2006 | Rachniowski et al. |
| 2006/0277340 A1 | 12/2006 | Mar |
| 2007/0055914 A1* | 3/2007 | Chandwani ........... G06F 11/008 714/47.2 |
| 2007/0130192 A1 | 6/2007 | Bolder et al. |
| 2007/0156889 A1* | 7/2007 | Bhrara .................. G06F 9/5027 709/224 |
| 2008/0016178 A1 | 1/2008 | Portugali |
| 2008/0172421 A1 | 7/2008 | Birnbaum et al. |
| 2009/0222466 A1 | 9/2009 | Allison et al. |
| 2009/0328024 A1 | 12/2009 | Li et al. |
| 2010/0057738 A1 | 3/2010 | Ianni |
| 2010/0281155 A1* | 11/2010 | Cipollone ........... G06F 11/3013 709/224 |
| 2011/0078576 A1 | 3/2011 | Jordan |
| 2012/0166874 A1 | 6/2012 | Bernardez et al. |
| 2013/0124908 A1 | 5/2013 | Gowin et al. |
| 2013/0326029 A1 | 12/2013 | Flynn |

OTHER PUBLICATIONS

Summons to Attend Oral Proceedings, dated Aug. 23, 2018, Application No. 13824773.9, filed Aug. 2, 2013; 9 pgs.
Canadian Examination Report, dated Aug. 16, 2018, Application No. 2,854,339, filed Nov. 9, 2012; 3 pgs.
Summons to Attend Oral Proceedings, dated May 4, 2018, Application No. 12848305.4, filed Nov. 9, 2012; 10 pgs.
European Examination Report, dated Dec. 1, 2016, Application No. 13824773.9, filed Aug. 2, 2013; 5 pgs.
European Examination Report, dated Oct. 5, 2017, Application No. 13824773.9, filed Aug. 2, 2013; 7 pgs.
European Examination Report, dated Sep. 22, 2016, Application No. 12848305.4, filed Nov. 9, 2012; 11 pgs.
Extended European Search Report, dated Aug. 26, 2015, Application No. 12848305.4, filed Nov. 9, 2012; 7 pgs.
Extended European Search Report, dated Dec. 18, 2015, Application No. 13824773.9, filed Aug. 2, 2013; 8 pgs.
International Preliminary Report on Patentability, dated Feb. 3, 2015, Int'l Appl. No. PCT/US13/053455, Int'l Filing Date Aug. 2, 2013; 8 pgs.
International Preliminary Report on Patentability, dated May 13, 2014, Int'l Appl. No. PCT/US12/064473, Int'l Filing Date Nov. 9, 2012; 9 pgs.
International Search Report, dated Feb. 7, 2014, Int'l Appl. No. PCT/US13/053455, Int'l Filing Date Aug. 2, 2013; 3 pgs.
International Search Report, dated Jan. 25, 2013, Int'l App. No. PCT/US12/64473, Int'l Filing Date Nov. 9, 2012, 3 pgs.
Written Opinion of the International Searching Authority, dated Feb. 7, 2014, Int'l Appl. No. PCT/US13/053455, Int'l Filing Date Aug. 2, 2013; 6 pgs.
Written Opinion, dated Jan. 25, 2013, Int'l App. No. PCT/US12/64473, Int'l Filing Date Nov. 9, 2012, 6 pgs.

\* cited by examiner

SYSTEMS AND METHODS FOR AUTOMATIC REPLACEMENT AND REPAIR OF COMMUNICATIONS NETWORK DEVICES

RELATED APPLICATIONS

The present application is a continuation of and claims the benefit of priority from U.S. patent application Ser. No. 13/673,550, filed Nov. 9, 2012, entitled "Systems And Methods For Automatic Replacement And Repair Of Communications Network Devices," the contents of which are fully incorporated by reference herein for all purposes. Application Ser. No. 13/673,550 claims priority under 35 U.S.C. § 119(e) to U.S. Provisional Application No. 61/558,857, filed Nov. 11, 2011, entitled "Systems And Methods For Automatic Replacement And Repair Of Communications Network Devices," the contents of which are fully incorporated by reference herein for all purposes.

TECHNICAL FIELD

Aspects of the present disclosure relate to communications networks, and in particular, to systems and methods for the automatic repair, replacement, and/or configuration of network devices within a communications network.

BACKGROUND

Communications networks provide voice and data communication between various types of computing devices including smart phones, tablets, personal computers, data servers, content servers, web servers and other possible end points. To provide such connectivity, most communication networks include a plurality of network devices, such as switches, routers, servers, interconnected by transmission links. Over time, in order to ensure quality service, the various network devices within the communications network may require repair, replacement, and/or configuration.

When a communications network experiences interruption in service due to one or more problematic network devices, system administrators usually have to manually intervene to repair, replace, and/or reconfigure the problematic network device. For example, a system administrator may monitor a communications network in an attempt to identify any failing or failed network devices. When such a device is identified, the system administrator proceeds by manually attempting to perform any repair and/or replacement procedures necessary to restore the device. Such manual intervention by the system administrator is disruptive, time-consuming, expensive, and in some cases labor intensive. For example, the system administrator may be required to order a replacement device, dispatch a technician to a remote facility where the technician removes the bad device, replaces it, and then must test and sometimes configure the replacement device. It is with these observations in mind, among others, that various aspects of the present disclosure were developed.

SUMMARY

Aspects of the present disclosure involve methods for automatic repair of network devices. The method includes one or more steps that may be executed by a processor. In particular, the method includes identifying a network device in a communications network. The method also includes identifying a profile comprising device identification information corresponding to the network device. The method includes establishing communication with the network device based on the identification information to determine a status for the network device. The method includes initiating at least one repair procedure to restore the network device based on the status.

Aspects of the present disclosure also include systems for automatic repair of networking components in a communications network. The system includes a processor and a database. The system further includes an automatic repair application comprising modules executable by the processor. The modules include a monitor module to identify a network device in a communications network. The modules also include a diagnosis module to: identifying, in the database, a profile comprising device identification information corresponding to the network device and establish communication with the network device based on the identification information to determine a status for the network device. The modules include a repair module to initiate at least one repair procedure to restore the network device based on the status.

Aspects of the present disclosure include non-transitory computer-readable mediums encoded with a repair application. The application comprises modules executable by a processor. The modules include a monitor module to identify a network device in a communications network. The modules also include a diagnosis module to: identifying, in the database, a profile comprising device identification information corresponding to the network device; and establish communication with the network device based on the identification information to determine a status for the network device. The modules include a repair module to initiate at least one repair procedure to restore the network device based on the status.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however the emphasis instead is being placed on illustrating the principles of the inventive concepts. Also, in the drawings the like reference characters refer to the same parts throughout the different views. The drawings depict only typical embodiments of the present disclosure and, therefore, are not to be considered limiting in scope.

DETAILED DESCRIPTION

The present disclosure describes systems and corresponding methods for automatic repair, replacement, and/or configuration of network devices within a communications network. In various aspects, a repair automation system receives one or more indications of one or more errors associated with an inoperative, failed, and/or otherwise unavailable network device within the communication network. The repair automation system may classify the errors as hardware related and/or software related, and automatically identify one or more repair procedures that may be performed to repair the failed network device. Subsequently, the repair automation system may automatically attempt the identified procedures. Alternatively, the repair automation system may provide data describing the identified errors and corresponding repair procedures to other external systems capable of performing such repairs and/or replacements. In various aspects, the repair automation system may determine that the network device is unavailable due to a lack of proper configuration within the communications network. Accordingly, the repair automation system may automatically identify and initiate one or more configuration procedures for the failed network device and automatically initiate such procedures.

Figure 1:
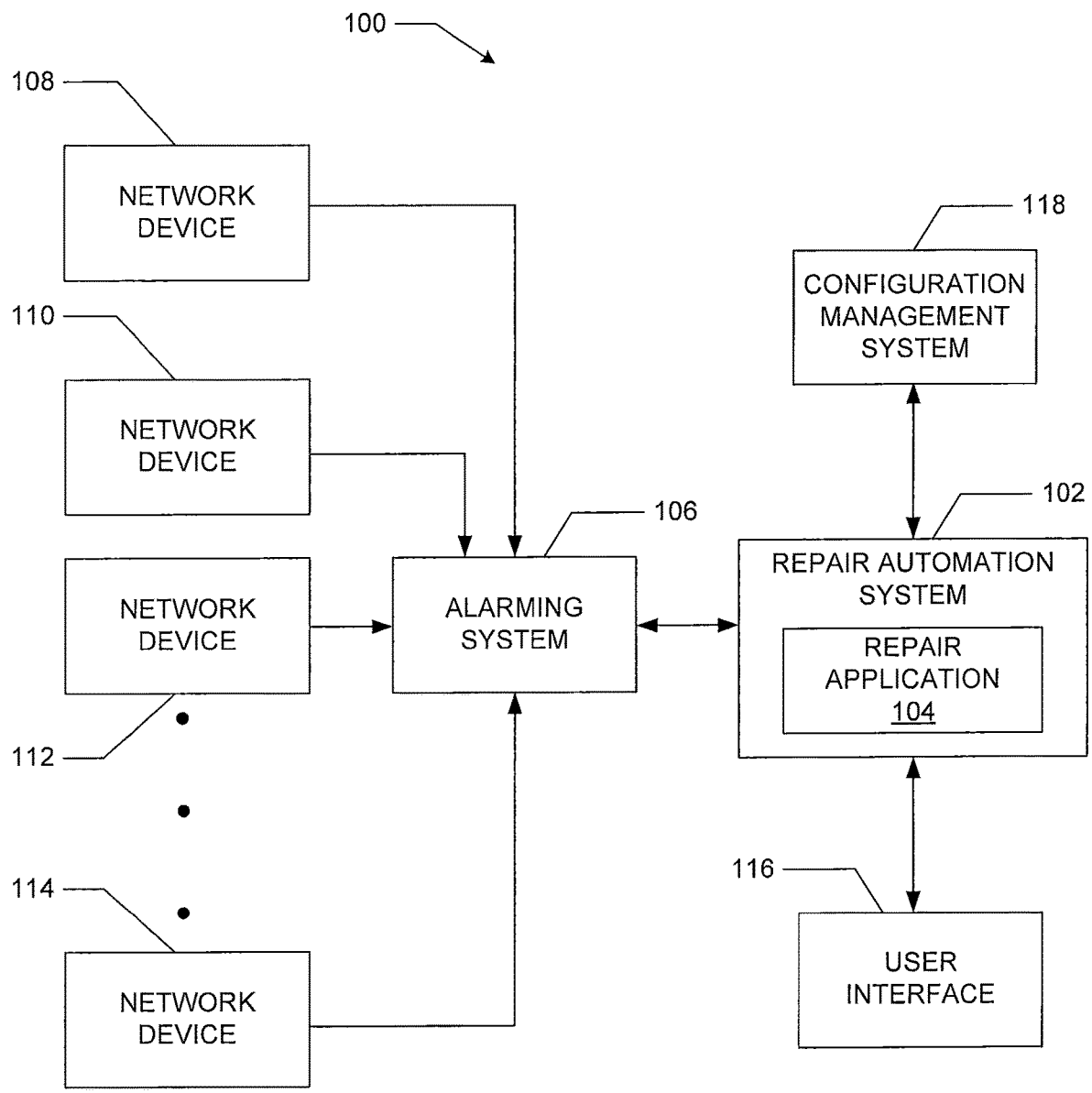
FIG. 1 is a block diagram illustrating a communications network, according to aspects of the present disclosure.

FIG. 1 illustrates an example communications network 100 comprising various network devices 108-114 capable of being monitored, repaired, replaced, and/or configured by a repair automation system 102. The communications network 100 may be a telecommunications network, the Internet, an intranet, a local area network, a wireless local network, or any other type of communications network, as well as combinations of networks. For example, in one particular embodiment, the communications network 100 may be an optical telecommunications network and each network device 108-114 may represent one or more: boxes, switches, routers, fiber optical links, and/or other optical telecommunications network devices that connect together to enable receiving and transmitting of data between various end users. As used herein, a box refers to a physical unit/machine that includes one or more processors, disk drives, memory, controllers, etc., capable of executing one or more applications, such as servers, server applications, etc. A box may also be generally described as including both hardware and software components and generally described as a server. The communications network may also encompass a data center in which many such network devices reside.

The repair automation system 102 includes various hardware and/or software computing components that may be used to monitor, repair, replace, and/or configure the network devices 108-114 within the communications network 100. In particular, the repair automation system 102 may receive an indication of an inoperative, failed, and/or unavailable network device. Subsequently, the repair automation system 102 may automatically identify and initiate one or more repair and/or configuration procedures to restore any network devices that may have failed within the communications network 100. Alternatively, the repair application 104 may automatically initiate a replacement process for any failed network devices that cannot be repaired or configured. The repair automation system 102 performs such procedures automatically with no or minimal manual intervention by network administrators, technicians and the like.

The repair automation system 102 may receive an indication from an alarming system 106 that one or more network devices within the communications network 100 are inoperative in some way. For example, the alarming system 106 may receive alarm data that a network device has failed. Alarm data may include log files, messages, events and/or other data describing or indicating an error and the type of error that caused the network device to fail. In one aspect, the alarming system 106 may retrieve messages, tokens, and/or the like, from the failed network device indicating the occurrence of a specific type of failure. Subsequently, the alarming system 106 may transmit a message or otherwise communicate to the repair automation system 102 describing the particular network device that has failed and any corresponding errors that may have caused the failure. For example, the alarm system 106 may retrieve a log file from a server A, indicating that the server has failed because an application executing on the server has timed-out. The alarm system 106 may generate a message indicating that server A has failed due to the failure of an application and transmit the message to the repair automation system 102. While the alarming system 106 is depicted in FIG. 1 as being external to the repair automation system 102, it is contemplated that the alarming system may be included within the repair automation system 102.

Alternatively, the repair automation system 102 may receive notification of an inoperable or otherwise malfunctioning network device from a network administrator. The network administrator may enter network device data into a user-interface (UI) 116. The UI 116 may be presented through a computing device with a display (not shown) such as a computer monitor, liquid crystal display, for viewing data and/or input forms, and any combination of input/output devices (not shown), such as a keyboard, or a pointing device (e.g., a mouse, trackball, pen, or touch pad), speaker, and/or any other type of device for receiving input from a user and providing output to a user. The network device data notifies the repair automation system 102 that there is a problem with one or more network devices within the communications network 100, and thus, the repair automation system 102 should attempt to repair and/or configure the device.

In various aspects, the repair automation system 102 may communicate with a configuration management system 118 to initiate the configuration of one or more network devices in the communications network 100. The configuration management system 118 automatically configures, tracks, and updates the configuration for various network devices within the communications network 100. "Configuration" defines the specific arrangement, characteristics, and settings of a particular network device that determine how the network device will operate within the larger communications network 100. For example, in optical communications networks, optical routers and servers are routinely configured for a specific purpose. Although the configuration management system 116 is depicted in FIG. 1 as being external to the repair automation system 102, it is contemplated that the alarming system may be included within the repair automation system 102.

Figure 2:
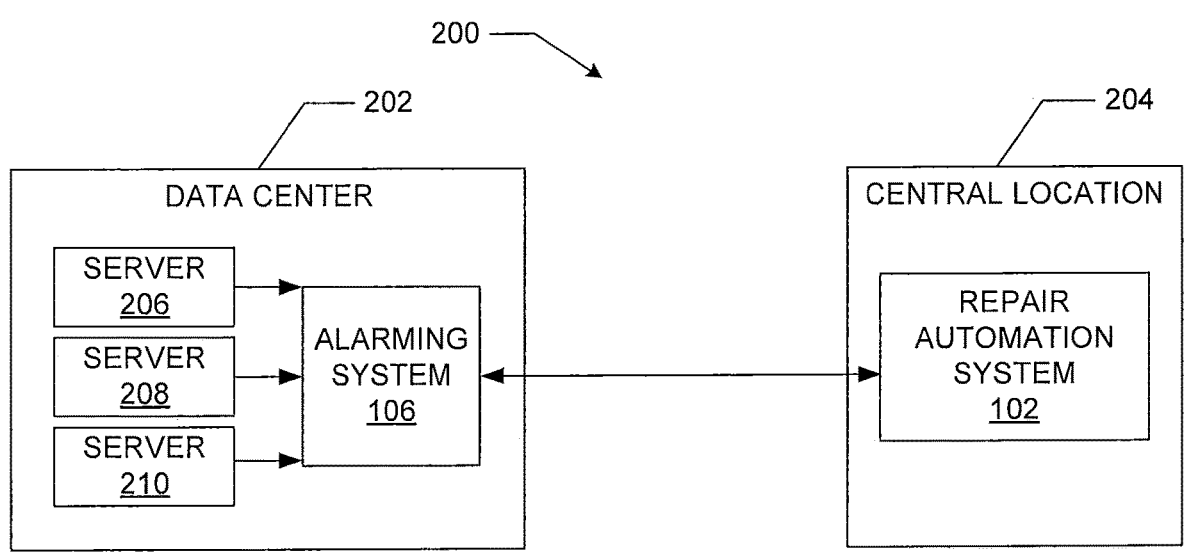
FIG. 2 is another block diagram illustrating another communications network and a repair automation system, according to aspects of the present disclosure.

FIG. 2 is an illustration of an exemplary embodiment of the repair automation system 102 according to aspects of the present disclosure. As shown in FIG. 2, one or more servers 206-210 (network devices) and the alarming system 106 may be located at a data center 202 within the communications network 100. The servers 206-210 are communicatively connected to the alarming system 106. When the alarming system 106 identifies some problem with one of the network devices (e.g., one of the servers 206-210 fails), the alarming system 106 transmits data indicating the failure of the network device to a remotely located central location 204 comprising the repair automation system 102. In this context, the repair automation system may be geographically remote from the data center or may be within the same data center facility. Being remote simply means that the repair automation system does not reside on one of the servers experiencing a failure. The alarming system 106 may transmit information to the repair automation system over a local network or a geographically dispersed network such as a wide area network like the Internet. Such communications may be transmitted over any type of wireline and/or wireless link configured within the communications network 100 such as a fiber optic link, and any other network devices necessary to transmit such data. While FIG. 2 only shows one data center 202, it is contemplated that multiple data centers capable of communicating with the repair automation system 102 may be included within the communications network 100. Additionally, in an extensive communication network, for the purposes of redundancy or otherwise, more than one repair automation system may be deployed. Finally, while FIG. 2 illustrates that the repair automation system 102 receives indication of a problem corresponding to one of the network devices (e.g., one of the servers 206-210) from the alarming system 106, it is contemplated that the repair automation system 102 may identify such problems by directly accessing the network devices, such as for example, by occasionally polling and/or checking the network devices, etc.

Figure 3:
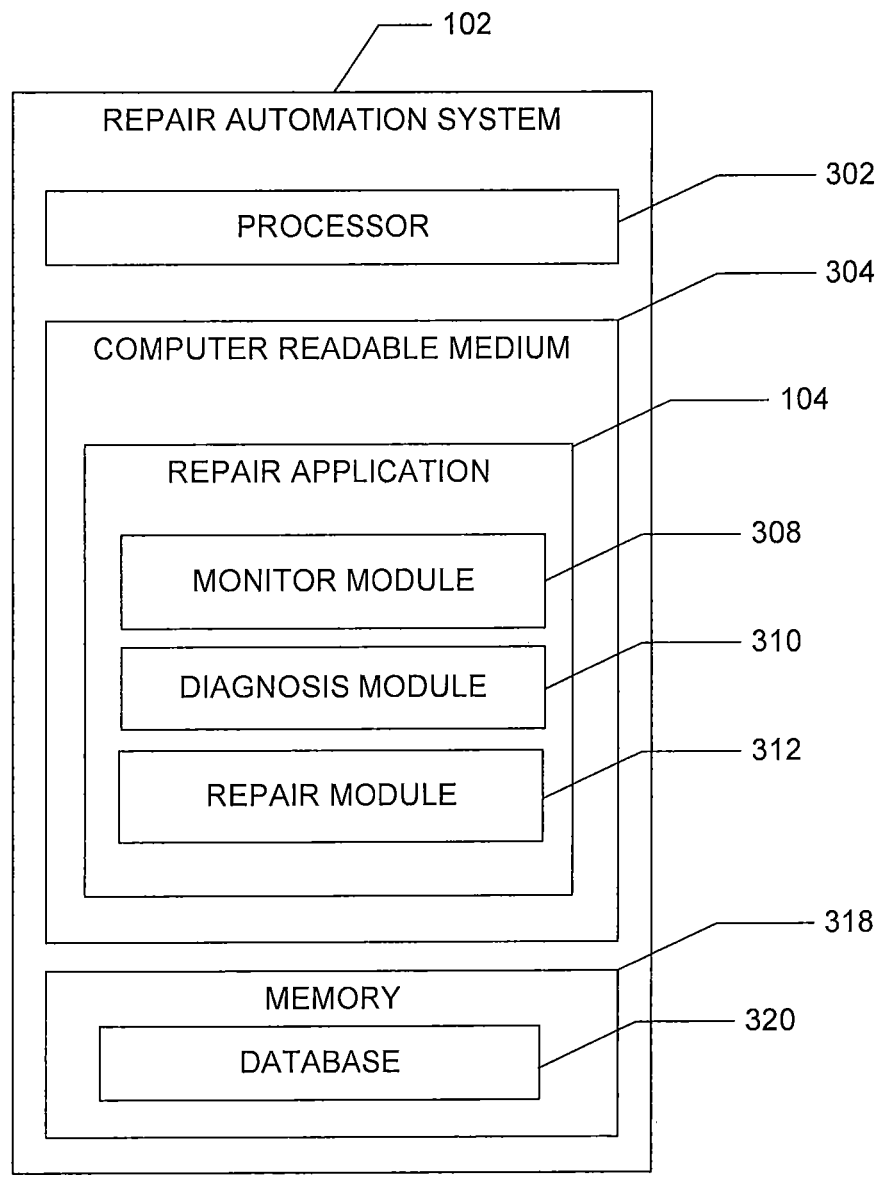
FIG. 3 is a block diagram illustrating a repair automation system, according to aspects of the present disclosure.

FIG. 3 is a block diagram illustrating the various hardware and/or software components of the repair automation system 102 according to aspects of the present disclosure. The repair automation system 102 may include a processor 302 that may be used to execute the repair application 104 that automatically initiates various repair, replacement, and/or configuration procedures for failed network devices. The processor 302 may include memory and/or be in communication with a memory 318, which may include volatile and/or non-volatile memory. The processor 302 may also include various other computing components. In one possible example, the processor is part of a server that runs the repair automation system.

The repair automation system 102 includes or otherwise has access to a database 320. The database 320 may be a general repository of data including network device configuration data, network device identification data, network device diagnostic data and/or other data relating to the identification and/or profile, errors, and configuration of a particular network device located within a communications network. The database 320 may include memory and one or more processors or processing systems to receive, process, query and transmit communications and store and retrieve such data. In another aspect, the database 320 may be a database server.

According to one aspect, the database 320 may contain one or more profiles for each network device in the communications network 100, including any network device identified as being problematic within the communications network 100. For example, for a communications network including four different servers, the database would include four different server profiles, each server profile corresponding to one of the particular servers within the communications network. In the example, the differences between the servers may include differences between the hardware of the server, the operating system running on the server, the file system running on the server, etc. A profile may include information that uniquely identifies a particular network device. For example, the profile may include an Internet protocol ("IP") address that uniquely identifies a network device. Alternatively, a network service access point address (NSAP) may be used. Other types of unique identifiers may be used to identify network devices, such as physical addresses, name identifiers, etc., and it is contemplated that any type of unique identifier may be included in a profile for network device identification. The profile may also include information describing the initial setup and/or configuration of the various hardware, software, and/or logical components within the network device. For example, the profile may include configuration information such as: hardware component configuration data; network communication configurations; available memory; storage space size; time stamp data; application association data (or versions thereof and/or one or versions of an application); application configuration data; firmware data; etc. Other configuration data may also be included. In yet another aspect, any errors and error data related to a particular network device may be stored in the database 320.

The repair automation system 102 may include a computer readable media ("CRM") 304 storing executable instructions to implement the repair application 104. The CRM 304 may include computer storage media, communication media, and/or another available media medium that can be accessed by the processor 302. For example, CRM 304 comprises computer storage media and communication media. By way of example and not limitation, computer storage media includes memory, volatile media, nonvolatile media, removable media, and/or non-removable media implemented in a method or technology for storage of information, such as computer readable instructions, data structures, program modules, or other data. Communication media includes computer readable instructions, data structures, program modules, or other data and include an information delivery media or system. The repair application 104 may include includes instructions or modules executable by the processor 302. Generally, program modules include routines, programs, objects, components, data structures, etc., that perform particular tasks or implement particular abstract data types.

In various embodiments, the repair application 104 may include a monitor module 308 that receives an indication and/or an alert that one or more network devices in a communications network is down, failed, and/or is otherwise unavailable. For example, the monitor module 308 may receive a message from the alarming system 106 indicating that a particular server is down in the communications network 100. As another example, the monitoring module 308 may receive a message from a communications network system administrator indicating a server within the communications network has failed.

Alternatively, the monitoring module 308 may periodically establish communication with various alerting systems and/or other external systems, applications, databases, etc., that may currently be monitoring the various network devices within a communications network 100 for errors, failures, etc. For example, the monitor module 308 may periodically or temporally establish communication with the alarming system 106 to pull information related to each network device monitored by the alarming system 106. Subsequently, the monitor module 308 may evaluate the pulled information to identify any problems and/or errors that may be present with any network devices.

When the monitor module 308 receives an indication of, or otherwise identifies a down, failed, and/or unavailable network device, the monitor module 308 automatically initiates a diagnosis module 310 to query the database 310 and obtain a profile, or known configuration data corresponding to the identified failed network device. More particularly, information articulating how the server was initially configured and what the device's original purpose was within the network may be obtained. For example, if the diagnosis module 310 received indication of a failed server C, the diagnosis module 310 may query the database 310 to obtain profile data comprising: the server C's unique identifier (e.g., an internet protocol address); any applications that are being executed on the server and related application configuration data; hardware configuration data; and/or the like. It is contemplated that any data related to describing the basic configurations of a network device in relation to the overall communications network in which the network device sits may be included in the profile data.

Once profile data for the identified network device has been obtained, the diagnosis module 310 uses the profile data to establish communication with the identified network device to determine the status of the network device. In one aspect, the diagnosis module 310 may determine whether the communications network is available/unavailable on the network device. For example, after the diagnosis module 310 obtained profile data including and IP address for a particular server "Sev1", the diagnosis module 310 may use the IP address located in the profile data in conjunction with an SSH or ping protocol to establish communication with the server "Sev1" to determine whether Sev1 is available on the communication network. Any type of communication protocol that may be used in conjunction with profile data may be used to establish communication with the network device, as well as other known methods of establishing communication.

If the diagnosis module 310 cannot establish communication with the network device—e.g., the device is down, failed, and/or unavailable—the diagnostic module 310 may identify one or more hardware based repair procedures to get the network device running, responding, and/or executing in an acceptable state. For example, the repair module 312 may receive a message from the diagnosis module 310 identifying a server as unavailable, and in response automatically initiate a corresponding re-boot procedure to restart the server. Alternatively, the repair module 312 may determine that the network device cannot be repaired and thus, should be replaced. The diagnosis module 310 may store data describing the various repair and/or replacement procedures initiated in the database 320 as diagnosis data.

After any repair procedures have been performed by the repair module 312, the diagnosis module 310 may reattempt to connect with the network device to determine whether the network device is operating correctly or remains unavailable. If the network device remains in a malfunctioning or inoperative state, the repair module 312 may provide a message to one or more external systems indicating that further interaction with the network device is required. For example, the repair module 310 may generate a token and/or ticket, such as a troubleshooting ticket, and transmit the ticket to an external system for processing. Such external systems may include a processing device executing one or more business processes as part of a business process management system. A network communication administrator may obtain the ticket from the external system and manually attempt to repair the network device based on the procedure described in the troubleshooting ticket received from the diagnosis module 310. For example, the trouble ticket may direct a network administrator to manually press a button on the failed network device to manually power-cycle the network device.

The repair automation system 102 may enter a wait state with regard to the particular system that has failed until the ticket transmitted to the external system has been performed. To determine whether a ticket have been performed, the external system may push information describing any action taken to repair the failed network device to the repair automation system 102. Alternatively, the repair automation system 102 may occasionally poll the external system for ticket status updates. When it is determined that the any issues corresponding to the network device have been resolved, the repair automation system 102 may verify the current state of the failed system and continue. Thus, referring to the example above, the repair automation system 102 may occasionally poll the external system for information indicating that an administrator has manually pressed the button to power-cycle the network device.

Subsequently, the repair module 312 may send a message to the diagnosis module 310, instructing the diagnosis module 310 to reattempt connecting to the network device as described above. Alternatively, the message may provide information indicating the network device cannot be repaired and thus all components or at least a component (e.g., hard drive, controller, memory, or processor) should be replaced in the network device. In response, the repair module may generate a token/ticket indicating that a replacement of the failed network device and/or component within the network device is necessary and provide a message to an external system and/or a network administrator capable of making such replacements.

When the diagnosis module 310 connects to the network device and determines that the network device is now available, the diagnosis module 310 may forward a message to the repair module 312 to collect information regarding the current state of the network device. Generally, state information refers to any information related to a unique and/or particular configuration of information in a program or machine at a particular time. For example, the repair module 312 may retrieve state information for one or more applications executing on the network device at the time of failure, as the execution of such applications may have caused the network device to fail. The diagnosis module 310 may retrieve information that describes the state of the network device and/or any applications executing on the network device at failure such as: log files associated with applications executing on the network device; output files for various hardware/software components within the network device; time stamp data; debugging data; configuration files, etc. It is contemplated that any type of data related to the state software applications executable by and/or executing on the network device at the time of failure may be retrieved by the diagnosis module 310. In one aspect, the state information may indicate that the network device has already attempted one or more repair procedures. Thus, the diagnosis module 310 may identify one or more additional repair procedures different from those already attempted. The state information may be stored in the database 320 and/or another database.

The diagnostic module 310 may analyze, parse, and/or process the retrieved state information to identify any applications or related application errors that may have caused the network device to fail, and one or more corresponding repair procedures. If it is determined that the cause of the failure of the network device is due to the execution of one or more applications, the repair module 312 may attempt to restore the application back to an acceptable configuration state. Stated differently, the repair module 310 may execute one or more repair procedures to put the network device in a state that may successfully execute the identified applications. Additionally, the diagnostic module 310 may test, scan, and/or evaluate the various hardware components of the network device and their particular configuration within the network device, in conjunction with processing the state information to identify a repair procedure. For example, assume a server C failed because an application A, executing on server C was accessing bad blocks/sectors within a disk drive located in server C. The diagnostic module 310 processes state information and tests the hardware of server C and determines that the network device failed due to application A attempting to access bad disk drive sectors by analyzing the state information and identify a repair procedure that causes the operating system operating on server C to force application A to map around the bad blocks/sectors within the disk drive when executing. Additionally, the repair module 312 may automatically identify and initiate a repair procedure to clean out the bad sectors within the disk drive. Thus, going forward, server C will no longer crash due to application A attempting to access bad disk drive sectors during execution.

As another example, the repair module 312 may automatically determine that server C failed because it has insufficient memory to execute application A. In particular, the repair module 312 may determine that the memory available within the server C is below a required threshold level, and thus cannot properly execute application A. Accordingly, when application A is executed it is causing the network device to fail. The repair module 312 may automatically provide a message to an external system indicating that the memory needs to be replaced. In some instances, the configuration of the applications executing on the network device may be modified if it is determined that the application configuration is incorrect, due to programmer modifications, application bugs, etc. A reinstallation of the application and its associated configuration may resolve the issues corresponding to the network device. For example, referring to server C above, application A may be reinstalled and reconfigured in an attempt to resolve server C's failure issues.

Figure 4:
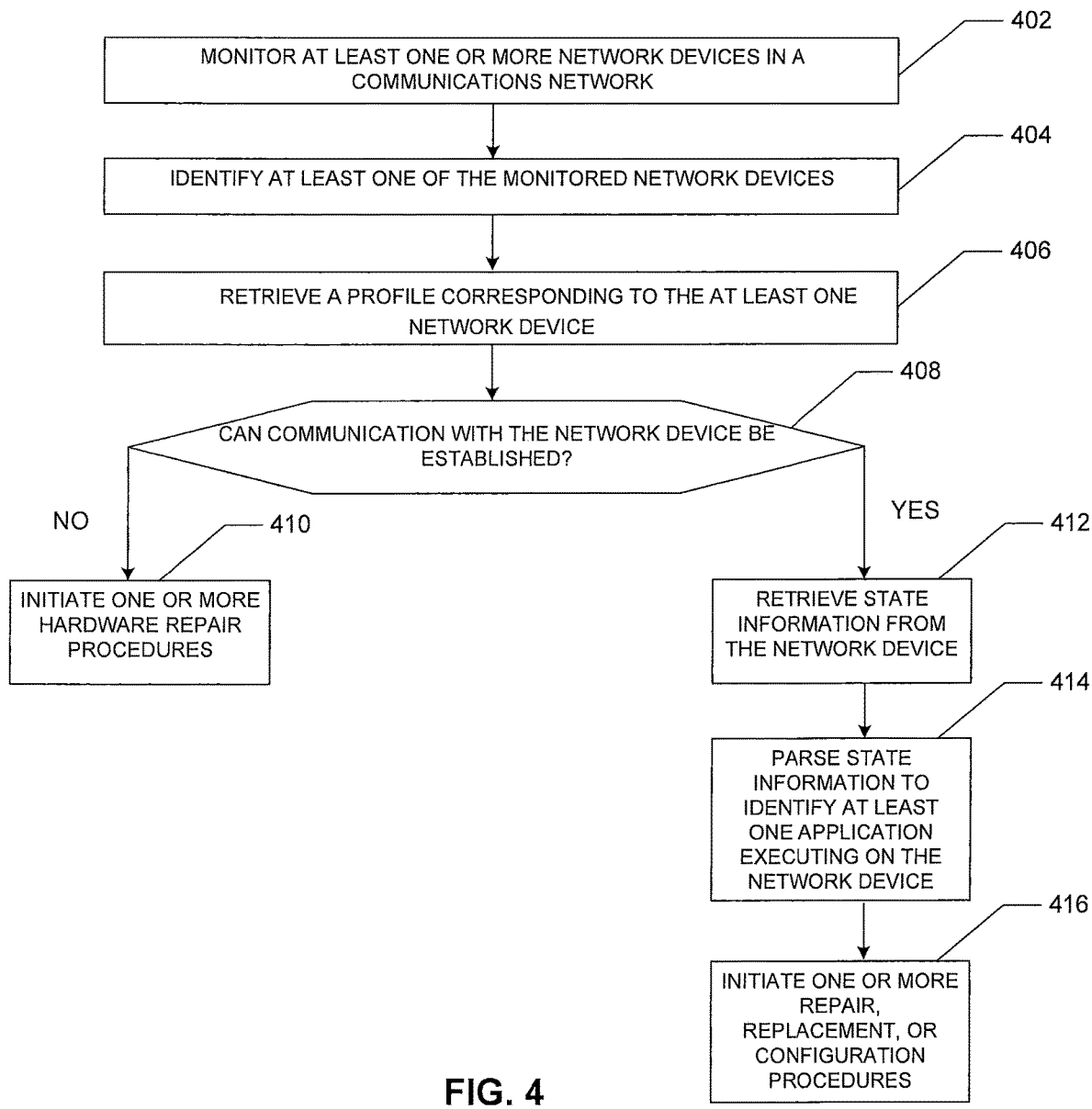
FIG. 4 is a flowchart illustrating an example process for monitoring, replacing, and/or repairing network devices in a communications network, according to aspects of the present disclosure.

FIG. 4 is a flow chart illustrating an example method for automatically repairing and/or replacing failed network devices within a communications network. The method may be used to automatically maintain the integrity of a communications network, such as a fiber-optic network comprising various network devices capable of receiving and transmitting data to end users. At block 402 one or more network devices within a communications network are monitored. Various methods may be used to monitor the network devices within the communications network. For example, the alarming system 106 may monitor the one or more network devices within the communications network 100 to identify whether any of the network devices are down, have failed, and/or become unresponsive. Alternatively, the repair application 104 may periodically retrieve data from the alarming system 106 and analyze the data to determine whether any network devices in the communications network have failed.

At block 404, at least one of the monitored network devices is identified and a profile corresponding to the network device is identified at block 406. For example, when the alarming system 106 determines that one of the network devices within the communications network 100 has failed, the alarming system 106 generates a message identifying the failed network device that may be received by the repair automation system 102. Subsequently, the repair automation system 102 executes a repair application 104 that queries a database 320 to identify a profile corresponding to the failed network device.

At decision block 408, the information in the profile is used to attempt to establish communication with the identified network device and determine the devices status. For example, the repair automation system 102 may use unique identifier information provided in the profile to connect to the corresponding network device to determine whether the network is available on the device. If no communication can be established and the network device status is considered unavailable, one or more hardware repair procedures are initiated to repair the network device at 410. For example, a repair procedure that re-boots the network device is initiated. Alternatively, if communication can be established with the network device and the network device's status is considered available, state information is retrieved from the network device at block 412. At block 412 the state information is parsed to identify at least one application executing on the network device that may have caused the device to fail. For example, log filed may be parsed to determine what execution cycle of the application caused the network device to fail.

At block 414 the identified application is restored to its properly executing state on the network device. At block 416, one or more repair, replacement, and/or configuration procedures are initiated to repair the network device based on the retrieved state information and the at least one application at 418. For example, the repair automation system 102 may initiate a replacement procedure to have the memory replaced in the failed network device.

Thus, in accordance with various aspects of the present disclosure and the various embodiments of the present invention described above, an automatic repair system may repair or initiate the repair of, and/or initiate the replacement of a down, failed, and/or otherwise unavailable network device within a communications network without manual intervention by network administrators.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for automatic repair of network devices in a communications network comprising:
    identifying, at a processor, a network device in a communications network;
    identifying, in a database, a profile comprising device identification information corresponding to the network device and device configuration information indicating one or more applications being executed on the device;
    establishing, using the processor, communication with the network device based on the device identification information to determine a status for the network device;
    when the status of the network device is available, determining state information based on the device configuration information, wherein the state information comprises a log file of the one or more applications, wherein the log file indicates that the network device previously failed due to the one or more applications attempting to access at least one bad storage location on the network device; and
    initiating, using the processor, at least one repair procedure to restore the network device based on the state information, wherein the at least one repair procedure comprises causing the one or more applications not to use the at least one bad storage location when executing.

2. The method as recited in claim 1 further comprising:
    determining, at the processor, that the at least one repair procedure failed;
    generating a repair ticket comprising instructions to repair the network device when the at least one repair procedure failed; and
    providing the repair ticket to an external system for processing.

3. The method of claim 1, further comprising:
    parsing the state information to determine the one or more applications attempting to access the at least one bad storage location.

4. A system for automatic repair of networking components in a communications network comprising:
    a processor;
    a database;
    an automatic repair application comprising modules executable by the processor, the modules comprising:
        a monitor module to identify a network device in a communications network;
        a diagnosis module to:
            identify, in the database, a profile comprising device identification information corresponding to the network device and device configuration information indicating one or more applications being executed on the device;
            establish communication with the network device based on the identification information to determine a status for the network device;
            when the status of the network device is available, determine state information based on the device configuration information, wherein the state information comprises a log file of the one or more applications, wherein the log file indicates that the network device previously failed due to the one or more applications attempting to access at least one bad storage location on the network device; and
        a repair module to:
            initiate at least one repair procedure to restore the network device based on the state information, wherein the at least one repair procedure comprises causing the one or more applications to not use the at least one bad storage location when executing.

5. The system as recited in claim 4, wherein the diagnosis module is further configured to:
    determine that the at least one repair procedure failed;
    generate a repair ticket comprising instructions to repair the network device when the at least one repair procedure failed; and
    provide the repair ticket to an external system for processing.

6. The system of claim 4, wherein the diagnosis module is further configured to:
    parse the state information to determine the one or more applications attempting to access the at least one bad storage location.

7. A non-transitory computer-readable medium encoded with a repair application comprising modules executable by a processor, the modules comprising:
    a monitor module to identify a network device in a communications network;
    a diagnosis module to:
        identify, in a database, a profile comprising device identification information corresponding to the network device and device configuration information indicating one or more applications being executed on the device;
        establish communication with the network device based on the identification information to determine a status for the network device;
        when the status of the network device is available, determine state information based on the device configuration information, wherein the state information comprises a log file of the one or more applications, wherein the log file indicates that the network device previously failed due to the one or more applications attempting to access at least one bad storage location on the network device; and
    a repair module to:
        initiate at least one repair procedure to restore the network device based on the state information, wherein the at least one repair procedure comprises causing the one or more applications to not use the at least one bad storage location when executing.

8. The non-transitory computer-readable medium as recited in claim 7, wherein the diagnosis module is further configured to:
    determine that the at least one repair procedure failed;

generate a repair ticket comprising instructions to repair the network device when the at least one repair procedure failed; and
providing the repair ticket to an external system for processing.

9. The non-transitory computer-readable medium as recited in claim 7, wherein the diagnosis module is further configured to:
parse the state information to determine the one or more applications attempting to access the at least one bad storage location.

* * * * *